(12) United States Patent
Bell

(10) Patent No.: US 6,240,457 B1
(45) Date of Patent: May 29, 2001

(54) COMPUTER NETWORK MANAGEMENT PROTOCOL INCLUDING SPECIFICATION OF MULTIPLE DATA ITEMS

(75) Inventor: Ernest Leslie Bell, Hemel Hempstead (GB)

(73) Assignee: 3Com Technologies, Grand Cayman (KY)

( * ) Notice: Subject to any disclaimer, the term of this patent is extended or adjusted under 35 U.S.C. 154(b) by 0 days.

(21) Appl. No.: 09/205,075

(22) Filed: Dec. 3, 1998

(30) Foreign Application Priority Data

Dec. 4, 1997 (GB) .................................................. 9725855

(51) Int. Cl.[7] ...................................................... G06F 15/16
(52) U.S. Cl. ............................ 709/230; 709/202; 709/223
(58) Field of Search ..................................... 709/230, 202, 709/223

(56) References Cited

U.S. PATENT DOCUMENTS

| | | |
|---|---|---|
| 5,561,769 | * 10/1996 | Kumar et al. . |
| 5,592,620 | 1/1997 | Chen et al. . |
| 5,651,006 | 7/1997 | Fujino et al. . |
| 5,960,176 | * 9/1999 | Kuroki et al. ........................ 709/223 |
| 5,968,116 | * 10/1999 | Day, II et al. ........................ 709/202 |
| 6,041,350 | * 3/2000 | Takimoto ............................ 709/223 |

FOREIGN PATENT DOCUMENTS

WO 95/08794   3/1995   (WO) ............................... G06F/3/00

OTHER PUBLICATIONS

"Design for a Simple Network Management Protocol Subagent for Internet Firewalls", IBM Technical Disclosure Bulletin, vol. 40, No. 3, Mar. 1997, pp. 63–68.

"Service Interface that Supports Simple Network Management Protocol", IBM Technical Disclosure Bulletin, vol. 35, No. 4A, Sep. 1992, pp. 182–186.

* cited by examiner

Primary Examiner—Krisna Lim
(74) Attorney, Agent, or Firm—McDonnell Boehnen Hulbert & Berghoff

(57) ABSTRACT

A computer network operating in accordance with a management protocol such as SNMP modifies the protocol such that a request communication from a management agent can be a type specifying multiplicity of data items and has a first part which identifies the type of the request.

7 Claims, 2 Drawing Sheets

Legend
10a: bridge
10b: repeater
10c: repeater
10d: repeater
12: port
14: communication core
16: management agent
20: network device
22: network connections

COMPUTER NETWORK MANAGEMENT PROTOCOL INCLUDING SPECIFICATION OF MULTIPLE DATA ITEMS

BACKGROUND OF THE INVENTION

1. Field of the Invention

The present invention relates to the management of computer networks and in particular to the communications which are sent via the network to achieve such management.

2. The Prior Art

It is well known to enable computing devices to communicate with each other by connecting them together in networks, for instance local area networks (LANs), which operate according to predetermined communication protocols and enable data to be shared by the various computing devices. To facilitate the interconnection of computing devices it is known also to provide communication devices which each have a plurality of ports to each of which ports can be connected a computing device or another communication device. By building up a network of communication devices a large number of computing devices can be interconnected in a single network and thereby enabled to communicate with each other.

As networks have grown larger, and the communication devices have grown more sophisticated, it is also known to provide management of the network. To enable a management to achieve the desired purpose it is necessary for it to be provided the details of how the network is functioning and for this purpose communication agents have been developed which, in addition to providing their basic communication function for the computing devices in the network, also collect information relating to the operation of the network. A "central" management agent can then communicate with management devices within the communication agents themselves, recover the collected information and, on the basis of the recovered information, perform the necessary management functions.

During normal operation of the network, the management devices collect the information mentioned above relating to the operation of the network and builds up values in a Management Information Base (MIB). Data relating to a number of different parameters may be collected in the MIB and different data within the MIB are commonly referred to as "objects", each having its own object identifier (OID). As the data builds up, a number of different values may be stored in relation to each OID, perhaps 10s 100s or 1000s of values, which different values are retained in the MIB in an indexed form so any required value may be accessed.

There has been proposed a particular protocol according to which communications which are concerned with the management of the network are to meet. This is known as the Simple Network Management Protocol (SNMP) and in a basic implementation of this protocol, the management agent sends a communication to a particular communication device which identifies the information required and in response the communication device sends a reply providing the requested information. In particular, each communication within the SNMP protocol comprises two parts, one of which contains the OID and the other contains the value. IN SNMP communications sent by the central management agent, the value may identify which indexed value in the identified object it is desired to access. Alternatively, as the management agent may not know how many value are within the object in question, the value field may indicate a "GET NEXT" request which is asking for the next value in the object from that which was accessed previously. In reply SNMP communications the value field carries in returned value from the MIB.

In its most basic form, an individual SNMP request and reply must be sent for each value in the MIB it is desired to read, and so a large sequence must be sent if for instance it is desired to read all or a number of the indexed values associated with a particular object. Additionally it is likely the case that the number of bits used to send the OID and other controls is larger than the number of bits used to represent the returned value itself. In this most basic form then, SNMP can cause a very large increase in the amount of traffic on the network, at times sufficient to cause a deterioration in the performance of the network in its principal function of allowing the computing devices to communicate with each other.

This significant increase of traffic results from the fact that each SNMP communication which is sent according to the basic system outlined above, must include the identification of the object information which it is desired to access and, as mentioned, this identifier is typically quite long and therefore takes up a significant proportion of the SNMP communication which is sent, and the response which is returned.

The need for the management device to send a separate communication for each item of information required also causes significant delays in the obtaining of the information required by the management device.

One scheme which has been previously proposed to reduce these problems has been to define a single object within the protocol, which is called an "accelerator object". The accelerator object has its own OID which is used to send and reply to requests within the SNMP protocol, but it is defined within the management devices as relating to a number of different objects and/or values within the MIB. The requested values from the MIB are combined together and sent in the value field in the SNMP reply sent by the local management device.

This accelerator object system therefore provides for a more efficient transfer of data back to the central management agent. In particular a large number of values perhaps relating to different objects can be returned simply by issuing a single SNMP request and receiving a single reply.

The system is however relatively inflexible. Whereas, in the basic arrangement outlined above, the central management agent is able to request only the information it requires, although this may entail a large number of separate requests, with the accelerator object the information which is returned is predetermined. This may result in the management agent receiving and having to discard unwanted data, or having to send additional requests for data not defined within the accelerator object.

SUMMARY OF THE INVENTION

The present invention provides in a computer network, a method of requesting data from a network device relating to the operation of that device according to a defined communication protocol in which each request communication comprises a first part identifying the data which is required and a second part, wherein said method comprises sending a request communication in accordance with said protocol in which said second part comprises identifications of a plurality of data items and said first part identifies that said second part is of a type which comprises said identifications.

The method of the invention may farther comprise, upon receipt of said request communication at said device, determining said identifications from said second part, assembling the values of said identified plurality of data items, and sending a reply communication in accordance with said protocol in which said second part comprises said assembled values and said first part identifies that said second part is of a type which comprises said assembled values.

Further the method may comprise upon receipt of said reply communication from said device, determining said assembled values from said second part.

The present invention is also a computer network comprising a plurality of interconnected network devices, including a first network device comprising means arranged to collect data relating to the operation of the first network device the network also including management means comprising request means arranged to send, to said first device, a data request communication according to a defined communication protocol in which each communication comprises a first part identify the data which is required and a second part wherein said request means forms said request communication such that said second part comprises identification of a plurality of data items and said first part identifies that said second part is of a type which comprises said identification.

Preferably, in the network, each first network device comprises means responsive to said request communication to determine said identification from said second part and to assemble the values of said identified plurality of data items and reply means arranged to send, to said management means, a data reply communication in accordance with said protocol in which said second part comprises said assembled values and said first part identifies that said second part is of a type which comprises said assembled values.

Further in the network, management means may comprise means responsive to said reply communication to determine said assembled values from said second part.

The invention further includes a network communication device for use in such a network, which comprises means responsive to said request communication to determine said identification from said second part and to assemble the values of said identified plurality of data items and reply means arranged to send, to said management means, a data reply communication in accordance with said protocol in which said second part comprises said assembled values and said first part identifies that said second part is of a type which comprises said assembled values.

Typically the first network devices defined above are network communication devices and may be, for instance, a repeater, bridge or switch.

Preferably the communication protocol used in the invention is Simple Network Management Protocol (SNMP).

According to the present invention then the management agent specifies, at the time of sending the request, the particular data which is required. This is done in a manner which is transparent to the SNMP protocol, but the request can be properly decoded by the receiving stations. This is achieved by sending an OID identified the variable object and utilizing the 'value' field in the SNMP request to define the required data.

By this means, the management agent can freely select which information is to be recovered, while not having to send an advance message setting up the Accelerator Object ready for reading by sending a further message.

This has the advantage that the management agent makes fewer requests of the agent software in the devices while maintaining the quantity of information in the requests, by packing more information into each one. This results in fewer packets being sent on the network, fewer sequential packet delays; lower protocol overheads; and more efficient use of network bandwidth which is particularly important for management of remote devices.

In particular it will be seen that this system combines the efficiency of the accelerator object system with the flexibility of the basic system in which specific data requests are made.

BRIEF DESCRIPTION OF THE DRAWINGS

Further features and advantages will become apparent from the following description of a preferred implementation of the invention which is given by way of example and with reference to the accompanying drawings, in which.

DETAILED DESCRIPTION OF THE DRAWINGS

In general terms, in this invention efficient transmission of management data in a computer network is achieved within the SNMP protocol by defining, in value fields in SNMP requests, the data which is required. The management agent is thus able to request only the data it requires while using efficiency provided by an accelerator object.

Figure 1:
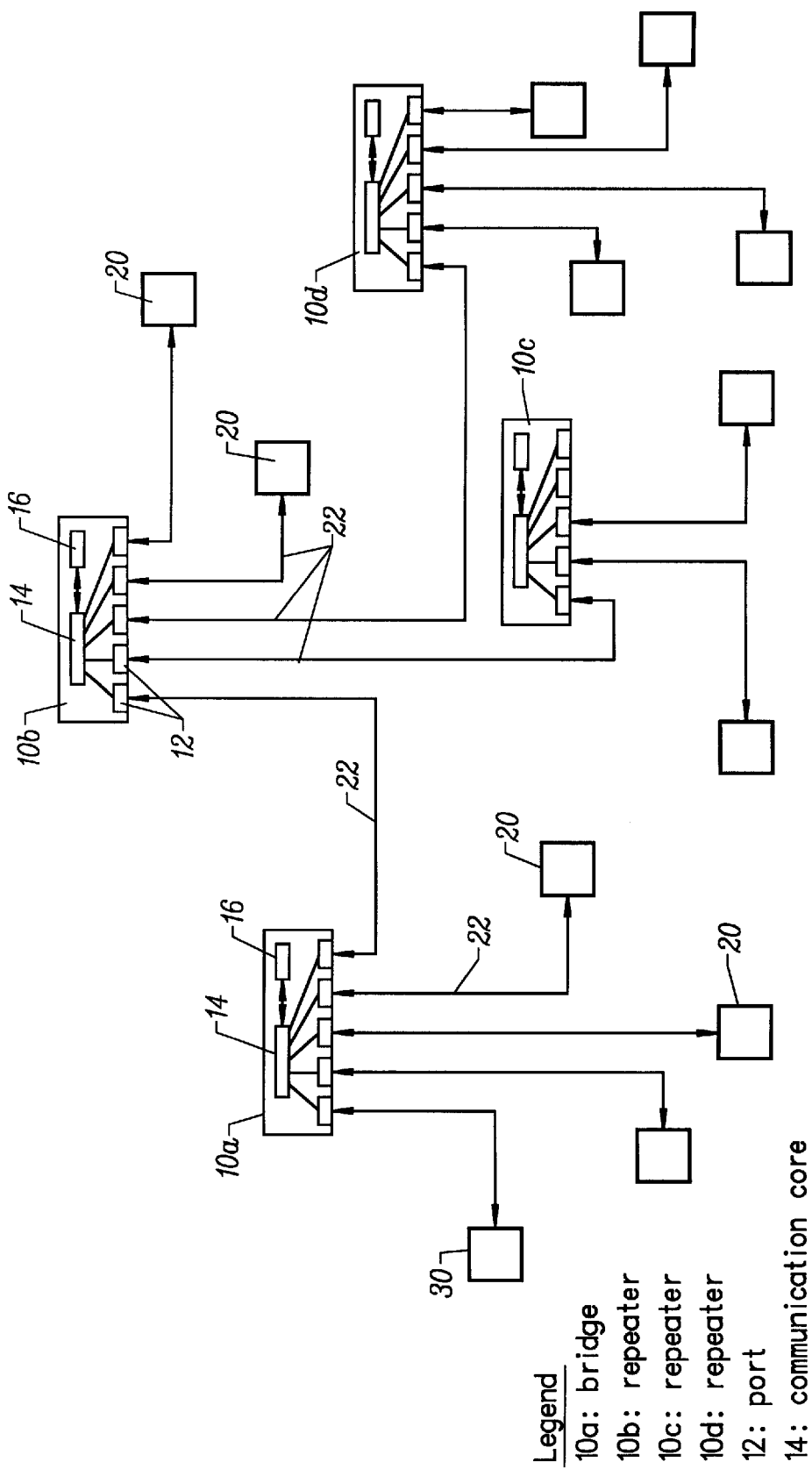
FIG. 1 is a schematic illustration of a computer network in which the present invention may be implemented.

FIG. 1 is a schematic illustration of a computer network in which the present invention may be implemented. The network comprises a plurality of network devices 20 which may be for instance computers, printers, etc. which are arranged to communicate via the network. The network also includes a number of communication devices 10 which are linked to each other and to network devices 20 via network connections 22. Each of communication devices 10 comprises a plurality of ports 12 to which connections 22 are attached and a communication core 14 which receives network communications arriving at ports 12 and re-transmits them according to a desired functionality. That functionality may be for instance a bridge function a repeater function and it may be that, within the network illustrated in FIG. 1, device 10a is a bridge or switch while devices 10b, 10c and 10d are repeaters. The operation of these devices is well known and is not discussed here. Each communication device 10 also comprises a management agent 16 which performs the above mentioned management functions and will be discussed in more detail below.

Finally within the network there is a central management agent 30. This may be a stand-alone device or it may simply be software running at one of network devices 20. The exact placement of agent 30 is not relevant to this invention but it is illustrated as a separate device for clarity. For the purpose of the management functions outlined above, each management agents 16 maintains statistical and other information relating to the communications passing through the respective device 10 in a MIB as discussed above. To recover this information management agent 30 sends communications according to the SNMP protocol addressed to the management agents 16, which send replies also according to the SNMP protocol.

It will be seen that, in particular if for instance management agent 30 is recovering information from management agents 16 of device 10d, the SNMP communications which are sent these must pass through devices 10b and 10a also. If there are a large number of communications these have potential for causing congestion within the network. This would impair the proper operation of the network which is to enable computers 20 to communicate efficiently with each other.

Network management agent 30 is intelligent enough to know what information it needs from each device 10 in the network. It has a built-in definition of each type of device 20 which is supported, or a configuration file which tells them about each device type, or a combination of both. The applications understand the Management Information Base (MIB) for the device and which groups they need to know from it, but they do not generally know the indexes of specific items for individual devices (without requesting at least some of the information first). The management agents 16 know the details of the specific items and they already support management requests using SNMP to retrieve these items, through a Generic Management Interface (GMI).

According to the preferred embodiment of this invention, multiple, arbitrary, MIB groups are allowed in each request. This is combined with the ability to make a request for an incompletely specified MIB item (i.e. without an index), returning all possible answers (with appropriate indexes) in the response. Requests for specific data are also maintained (within the same packet), so the response is optimised (for size and processing time) when the application knows exactly what it needs.

As SNMP does not support multiple values being returned to a single request, this must all be packaged into an opaque item (an OctetString) which can be encoded and sent in the value field of the SNMP request and then decoded by the Generic Management Agent (GMA) and the applications within device 10. This item itself becomes an entry in the MIB: the accelerator object (TAO), through which all accelerated management requests are made.

The accelerator object itself being a MIB item has the advantage of providing a singe access point into the device 16, through which all decoding and encoding of this object can take place. The GMA database access function for the accelerator object has the responsibility of decoding the OctetString into its component objects; making the requests to satisfy those objects, for all of the values that satisfy an incompletely specified MIB item; encoding all of the results; and finally returning a single response to the management application.

To obtain all of the values, the accelerator access function behaves as a proxy agent. It requests the values for the actual objects referenced, through the GMI. This includes resolving incompletely specified MIB items through appropriate ReadNext requests of the type used in basic SNMP requests.

The management agent 30 is responsible for identifying what information it needs (as completely as possible); encoding this in a single OctetString; and sending it to the bridge or switch 10a. The resulting response must be decoded before the values can be extracted into the relevant local data structures.

Figure 2A:
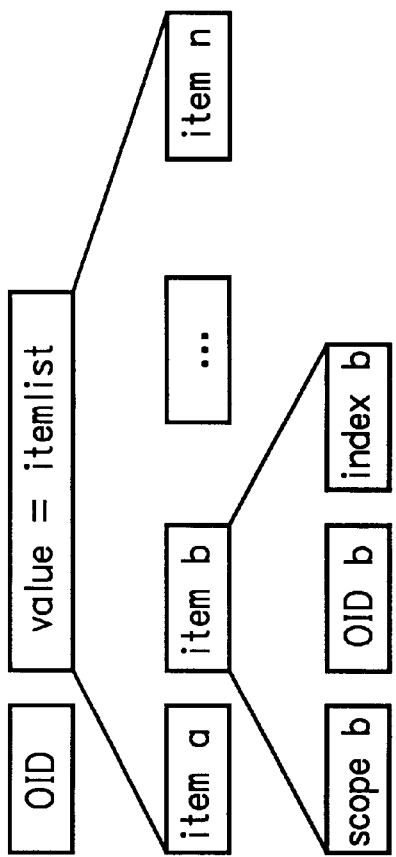
FIGS. 2A and 2B illustrate SNMP communications in a preferred embodiment of this invention.

FIG. 2 illustrates in general terms the format of the SNMP communications sent in this invention. FIG. 2A illustrates a SNMP Get Request such as would be sent by management agent 30. In its basic format, the SNMP communication conforms to the SNMP protocol in that it has an OID part and a "value" part. This ensures that it will be handled properly within the SNMP protocol. However, in the invention the OID part identifies the variable accelerator object in the management agents 16, and the data in the "value" part defines what exactly is being requested. in the example of FIG. 2A, the value is a list of items, each of which relates to a particular defined OID and defines other parameters, such as scope and index, for the request to that OID. In this manner a number of data requests addressed to a flexibly defined selection of OIDs can be sent in a single SNMP communication.

Management agents 16 are arranged to receive such communications in the normal way and determine that the SNMP communication relates to a variable object by reference to OID of the overall communication. The devices also include means then to read the data in the value field in order to determine and reply to all of the individual data requests it contains. These replies are combined together in a SNMP reply communication for instance as shown in FIG. 2B.

Figure 2B:
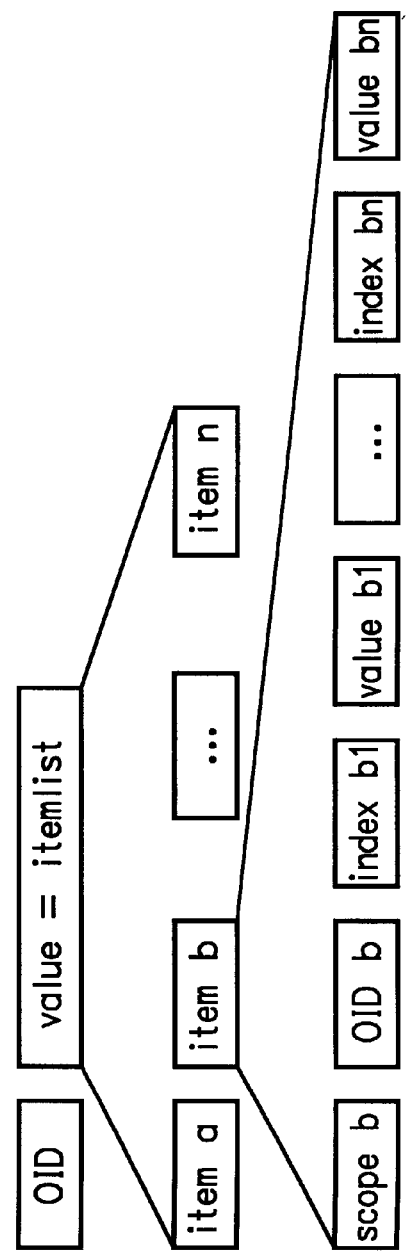

As illustrated in FIG. 2B, the reply also conforms to the basic SNMP protocol as it comprises an OID part and a value part. Again the OID identifies the variable object, causing management agent 30, upon receipt, to process the data in the value part to recover the replies it contains. As illustrated, the general format of the value field is similar to that in the request communication, in that it contains a number of items, but now each item includes the requested data relating to the specified OID. In this manner, data relating to a number of OIDs according to the definition in the request is returned in a single SNMP communication.

In the following, a particular implementation, with encoding scheme, is described in detail, by way of example to assist understanding of the invention.

The Accelerator Object (TAO)

At the top level, the accelerator consists of an action such as "READ", followed by a list of MIB items to which it should be applied.

In this implementation, each item consists of the length, scope, and OID for the MIB item. This may also include the indexes and values of specific rows within a table. Each of these fields is described below.

The length is the total length of this encoded item, including the scope, OID, indexes and values, but excluding the length field itself. This is used to determine when the end of this item has been reached.

The scope is the number of rows from the table this item refers to. A value of 0 may be used to refer to all rows of the table. In a request, this number tells the agent how many instances of this item to return. In a response, this number tells the application how many instances have actually been returned. If the item referred to is not in a table, or if the application wants a specific instance, then this should have the value 1, for the singular instance of the item.

The OID and indexes are lists of integers, preceded by the number of integers in the list. If an index is given in a Read or a Next request, it is used as the first index from which to start reading the table. Indexes must be given for Write requests.

The value is one of the types "unsigned integer", "signed integer", or "octet string". Octet strings, in this sense, are opaque data structures with a syntax that is understood by both the requester and the responder, but not by the accelerator object. Values are ignored in Read and Next requests.

The structure summarized above, is set out in more detail in the following definitions below, fields in <...> have further definitions; items in [...] are optional; fields in (...|...) represent choices; * after a field means "0 or more of these may appear"; +after a field means "1 or more of these may appear"; UNIT, INT and OCTETSTRING are primitive types which have encoding rules defined in the section on TAO Data Encoding.

TAO::=<item>*
<item>::=<itemLength><itemScope><oid><oidScope>
   [<index>[<value>]]*

```
<itemLength::>=UINT
<itemScope>::=UINT
<oid>::=<oidLength><oidList>
<oidLength>::=UINT
<oidList>::=<oidInt>+
<oidInt>::=UINT
<oidScope>::=UINT
<index>::=<indexLength><indexList>
<indexLength>::=UINT
<indexList>::=<indexInt>+
<indext>::=UINT
<value>::=(UINT|INT|OCTETSTRING)
```
TAO with Implicit Indexes A variation on the TAO defined above can be provided for situations where the management application knows in advance the indexes for all of the values returned in each item. Index values may still be given in Read or Next requests, but they are omitted from the Response. The benefits are in the bytes saved by not encoding the index. This results in being able to pack two to three times as many integer values in a response. The definition is the same as that given above, with the following modification for a Response:

```
<item>::=<itemLength><itemScope><oid>[<value>]*
```

The ordering of the values returned by the TAO must be the same as would be returned using the SNMP GetNext function.

This version of the TAO is compatible with and can easily be supported alongside the TAO described above, as the difference is only the omission of the, index in the packing and unpacking functions. The management application has the additional task of attaching the returned values to the list of indexes it has already determined.

Defining multiple TAO objects is not a problem. Each TAO is a separate, object, defined, in the preferred embodiment, under a new group within the MIB. The definitions for each would be identical, except for their descriptions. A management application would have to understand when it can use each version; the GMA would simply provide slightly different access functions for them.

TAO Data Encoding

This is intended to be as simple as possible. It is designed to support arbitrary length, signed and unsigned integers and arbitrary length opaque values (encoded as octet strings). These are the only three types defined, for simplicity.

The basic encoding tags every value with a type and length. For integers (signed and unsigned) the length is implicit within the encoding, for octet strings, the length is explicitly stated, as an encoded integer.

There are only three types defined, so only two bits need to be used to encode it, for any value. The values assigned to each type are (in binary):

unsigned integer 00
signed integer 01
octet string 10

For integers, the values are encoded in a minimum number of bits, rounded up to the nearest byte boundary. The length of the value is indicated by the use of a 'more' flag in the most significant bit of the value in each byte. This is bit 7 for all but the first byte, which uses bit 5 as the 'more' flag, as bits 6 and 7 are used to encode the type of the value.

For strings, the encoding is defined as for an unsigned integer, giving the length of the string, followed by the bytes making up the string. This is more efficient than using the 'more' flag for strings greater than 5 bytes in length, The following illustrates the encoding. In the following, bit 7 (most significant bit) is on the left, bit 0 (least significant bit) is on the right. The subsequent bytes may appear 0, 1, or more times, as required to encode all bits of the value.

| Unsigned Integer | |
|---|---|
| 1st byte: | {0 0 x v v v v v} representing Type (2-bits); More (1-bit: 1 = more, 0 = end-of-value); Value (5-bits) |
| Subsequent bytes | {x v v v v v v v} representing More (1-bit: 1 = more, 0 = end-of-value); Value (7-bits) |
| Signed Integer | |
| 1st byte: | {0 1 x v v v v v} representing Type (2-bits); More (1-bit: 1 = more, 0 = end-of-value); Value (5-bits) |
| Subsequent bytes | {x v v v v v v v} representing More (1bit: 1 = more, 0 = end-of-value); Value (7-bits) |
| Octet String | |
| 1st byte: | {1 0 x v v v v v} representing Type (2-bits); More (1-bit: 1 = more, 0 = end-of-value); Length (5-bits) |
| Subsequent bytes | {x v v v v v v v} representing More (1-bit: 1 = more, 0 = end-of-value); Length (7-bits); then - |
| Octet bytes | {o too o o o o o} |

Some examples of these types are illustrated in the following tables:

| | unsigned integers | |
|---|---|---|
| Decimal | Hexadecimal | Encoded Hexadecimal |
| 0 | 00 00 00 00 | 00 |
| 31 | 00 00 00 1F | 1F |
| 32 | 00 00 00 20 | 20 20 |
| 555 | 00 00 02 2B | 24 2B |
| 66666 | 00 01 04 6A | 24 88 6A |

| | signed integers | |
|---|---|---|
| Decimal | Hexadecimal | Encoded Hexadecimal |
| 0 | 00 00 00 00 | 40 |
| 31 | 00 00 00 1F | 60 1F |
| 32 | 00 00 00 20 | 60 20 |
| 555 | 00 00 02 2B | 64 2B |
| 66666 | 00 01 04 6A | 64 88 6A |
| −1 | FF FF FF FF | 5F |
| −15 | FF FF FF F1 | 51 |
| −31 | FF FF FF E1 | 7F 61 |
| −555 | FF FF FB D5 | 77 55 |
| −66666 | FF FE FB 96 | 7B 77 16 |

| octet strings | |
|---|---|
| String | Encoded Hex |
| empty octet string | 80 |
| null terminated empty 'C' string ("") | 81 00 |
| character 'A' | 81 41 |
| null terminated string 'A' | 82 41 00 |
| "test" | 84 74 65 73 74 |
| "Testing, testing, one, two, three." | A0 22 54 65 73 74 69 6E 67 2C 20 74 65 73 74 69 6E 67 2C 20 |

-continued octet strings

| String | Encoded Hex |
| --- | --- |
| | 6F 6E 65 2C 20 |
| | 74 77 6F 2C 20 |
| | 74 68 72 65 65 2E |

Distributed Management TAO

TAO, as defined above, defines an encoding for packing multiple MIB items into a single request. For distributed management architectures, such as that implemented in recent network equipment, collating all of the data from each of the distributed units may present an unwelcome processing burden on the unit dealing with TAO requests on a system-wide basis. It may be better to allow each of the distributed management processors to respond individually. So a device may choose to implement TAO in a table, indexed by the identity of the module that is to respond. Each table row would have a TAO as shown above.

It will be seen then that this invention enables efficient requesting and returning of management data within the SNMP protocol which combines the efficiency of the accelerator object system with the flexibility to recover only required data.

What is claimed is:

1. In a computer network, a method of sending from a network device management data relating to the operation of said device; said method comprising the steps of:
   (i) sending from a management agent to said device a request communication according to a defined management protocol, said defined management protocol specifying said request communication to comprise a first request part and a second request part, said sending step including:
      (a) sending said second request part in a form which identifies a plurality of different data items; and
      (b) sending said first request part in a form which identifies said second request part as a type which identifies a plurality of different data items; and
   (ii) responding to said request communication, said responding step including:
      (c) determining said identification from said second request part;
      (d) assembling values of the identified plurality of items; and
      (e) sending a reply communication to said management agent, said reply communication being in accordance with said defined management protocol and having a first reply part and a second reply part wherein said second reply part comprises an assembly of said values and said first reply part identifies said second reply part as a type which comprises an assembly of values.

2. A method as in claim 1 wherein said defined management protocol is the Simple Network Management Protocol (SNMP).

3. The method of claim 2 in which different types of data available at said device are identified by Object Identifiers (OIDs) and said second part of said communication comprises the OIDs and other necessary parameters identifying said plurality of data items.

4. The method of claim 3 in which said first part of said communication is in the form of an OID.

5. The method of claim 1 further comprising, upon receipt of said request communication at said device, determining said identifications from said second part, assembling the values of said identified plurality of data items, and sending a reply communication in accordance with said protocol in which said second part comprises said assembled values and said first part identifies that said second part is of a type which comprises said assembled values.

6. The method of claim 5 in which said defined communication protocol is Simple Network Management Protocol (SNMP).

7. The method of claim 5 further comprising upon receipt of said reply communication from said device, determining said assembled values, from said second part.

* * * * *